United States Patent Office 3,283,936
Patented Nov. 8, 1966

3,283,936
CURED VINYL CHLORIDE RESIN-EPOXIDIZED LINSEED OIL COMPOSITIONS AS CLOSURE CAP GASKETS
Alfred W. Kehe, Berkeley, and Harold W. Unger, Elmhurst, Ill., assignors to Continental Can Company, Inc., New York, N.Y., a corporation of New York
No Drawing. Filed Nov. 2, 1962, Ser. No. 235,120
7 Claims. (Cl. 215—40)

This invention relates to closure caps (e.g. threaded, lug and press-on type) for glass containers having improved gaskets or liners formed of cross-linked plastic gasket or liner composition consisting essentially of vinyl chloride base resin and epoxidized linseed oil (plasticizer). The gaskets or liners of the present invention are characterized by: (1) their excellent resistance to extraction by fatty or oily substances; (2) their very low order of gas permeation (transmission), especially by oxygen; (3) the ease with which they may be formed or deposited in cap shells in high volume production; and (4) their high rate or degree of cross-linking in the temperature range of 420 to 430° F. which allows practical high speed closure operations.

The cross-linked plastic gasket or liner compositions may be applied either as plastisols, or by several other techniques as hereinafter described. The use of polyvinyl chloride base plastisol gasket and liner compositions for closure caps for glass containers dates back several years and such compositions have been described in several patents including, for example, Patent 2,528,506 to Foye, dated Nov. 7, 1950, and Patent 2,874,863 to Unger and Zipper dated Feb. 24, 1959. Commercially satisfactory gasket or liner compositions for closure caps must have an exhibit several critical and demanding characteristics or properties, making them relatively complex and highly specialized formulations. While certain polyvinyl chloride base gasket or liner compositions have already met with very substantial commercial success there are even greater demands for such compositions having improved properties and characteristics.

Resistance of the gaskets and liners to oily and fatty substances has been a problem. Generally speaking, it has been found that most monomeric and polymeric plasticizers which are added to polyvinyl chloride resins to impart adequate flexibility and resiliency thereto, are also readily extracted by fatty or oily type substances and products. Many of these plasticizers also tend to increase the gas permeation characteristics (i.e. lower the resistance to gas transmission) of the gaskets or liners formed therefrom. The degree to which the latter phenomenum occurs will depend largely on the amount, molecular weight, symmetry and functional groups of the plasticizer. It is well known that extremely low oxygen permeability is desirable in food packages such as nuts, processed meats, and other fatty or oily foods to prevent discoloration, oxidation, and rancidity.

It has now been found in accordance with the present invention that a highly epoxidized linseed oil plasticizer in a vinyl chloride base homopolymer or copolymer formulation can be readily applied and cross-linked at fusion (i.e. curing or fluxing) temperatures ranging from 420 to 430° F. to provide gaskets and liners for closure caps which exhibit extremely low orders of gas transmission and excellent resistance to extraction by fatty or oily substances.

The basic or essential ingredients or constituents of the cross-linked plastic gasket or liner compositions of the present invention are vinyl chloride base resin and epoxidized linseed oil plasticizer having a minimum oxirane content of 9% and a maximum iodine value of 5, the vinyl chloride resin predominating over the plasticizer. Other constituents that will usually be included, in small or minor amounts, are pigments or fillers and lubricants. It was found that as the oxirane content decreases in these compositions a corresponding decrease in oil resistance and increase in gas transmission occurs and for this reason it is important that the epoxidized linseed oil constitutent possesses a minimum of 9% oxirane.

The object of the invention, generally stated, is the provision of closure caps for glass containers having improved polyvinyl chloride base gaskets and liners on the interior thereof which are improved in comparison with currently available gaskets and liners in respect to their low transmission or permeation of gas, particularly oxygen, their high resistance to extraction by fatty and oily substances, the ease with which they may be introduced or lined into cap shells, and their high rate or degree of cross-linking in the fluxing temperature range of 420 to 430° F. which permits practical high speed closure operations.

Certain other more specific objects of the invention will, in part, be obvious and will in part appear hereinafter.

For a more complete understanding of the nature and scope of the invention, reference may now be had to the following detailed description thereof wherein preferred working examples are given.

The vinyl chloride base resin that is to be plasticized by the epoxidized linseed oil can be any vinyl polymer such as polyvinyl chloride, vinyl chloride-vinyl acetate copolymers, vinyl chloride-vinylidene chloride copolymers, vinyl chloride-alkyl maleate copolymers and vinyl chloride-acrylonitrile copolymers. Since the vinyl chloride content predominates in these resins they are usually referred to as "vinyl chloride base resins." Preferred vinyl chloride base resins are the suspension vinyl chloride homopolymers and copolymers possessing a molecular weight of at least 45,000 and/or the emulsion polymerized chloride homopolymers with a molecular weight of at least 90,000. Vinyl chloride base resins of the above types are well known in the art and available commercially from several sources. These vinyl chloride base resins have been previously used in plastisol formulations.

The expoxidized linseed oil plasticizer of the present invention may be represented as having the following formula:

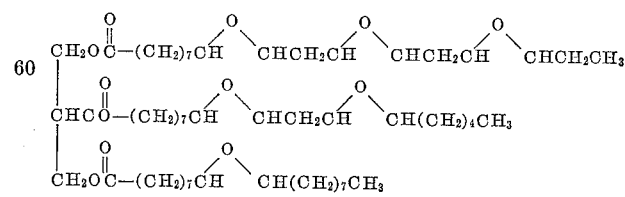

These epoxidized linseed oil plasticizers should have an oxirane content of at least 9% and a maximum iodine value of 5. The epoxidized linseed oil is a highly reactive poly epoxide monomer containing on the average 5.5 epoxy groups plus 3 ester linkages per molecule. The linseed oil epoxidation process is accomplished in known manner with the aid of hydrogen peroxide, a carrier acid such as formic acid, and a catalyst such as sulfuric acid. This process converts 90 to 95% of the starting unsaturation to epoxide. The final product contains a minimum of hydroxylated and polymeric by-products. Properties of the epoxidized linseed oil are summarized in the following table:

TABLE I

| | |
|---|---|
| Equivalent weight/epoxy group | 175 to 178. |
| Equivalent weight/ester group | 318 to 333. |
| Molecular weight | 980 approx. |
| Oxirane content | 9% minimum. |
| Iodine value | 5 maximum. |
| Gardner viscosity at 25° C. | 880 cps. |
| Acid number | 0.3 maximum. |
| Specific gravity | 1.013 to 1.027. |

For a more detailed description of a procedure for epoxidizing linseed oil reference may be had to Swern and Findley Patent 2,569,502 dated October 2, 1951 and Findley and Ohlson Patent 2,964,484, dated December 13, 1960, which incorporates by reference their copending application Serial No. 437,876, filed June 18, 1954. The epoxidized linseed oil is obtainable commercially under the trade name Epoxol 9-5.

Gasket and liner compositions made in accordance with the present invention consist essentially of vinyl chloride base resin and epoxidized linseed oil. In fact these two constituents will constitute at least about 90% by weight of the compositions with the vinyl chloride base resin constituent always being at least somewhat in excess of the epoxidized linseed oil, and even over twice the amount of epoxidized linseed oil.

The following is a general formulation for a gasket or liner composition made in accordance with this invention:

*General formulation*

| | Parts by weight |
|---|---|
| Vinyl chloride base resin | 100 |
| Epoxidized linseed oil | 50–90 |
| Pigment (filler) | 1–5 |
| Lubricant | 1–7 |

For optimum properties with regard to resistance to transmission or penetration by oxygen the upper amount or proportion of epoxidized linseed oil plasticizer in the above general formulation should not exceed about 60 parts.

Fillers or pigments are optional ingredients. Fillers that can be used include barium sulfate, mica and finely divided silica. Pigments such as titanium dioxide and zinc oxide may be added to impart opaqueness and color.

Suitable lubricants will normally be included in order to impart proper opening torque values in lining caps of the type that have to be rotated (e.g. lug or screw caps to be removed). The lubricants may be selected from the group comprising fatty acids, petroleum waxes, and silicone oils. Preferred lubricants of the above group are stearic acid, oleic acid, erucic acid, paraffin wax, dimethyl polysiloxane, and methyl hydrogen polysiloxane.

These gasket or liner compositions may be prepared and applied in several different ways. They may be prepared as plastisols and then flowed-in to the cap shells. The compositions may be extruded as sheet stock with fusing of the plasticizer and polyvinyl chloride resin in the extruder. In place of extruding, known calendering or molding techniques may be employed.

After preparation in plastisol form by simply blending the ingredients in the desired proportions, the plastisol compositions are deaerated and then introduced, in known manner, into the closure cap shells. They are flowed-in as annular gaskets or spun-lined as overall panel liners into threaded, lug or press-on type closures. They may also be applied to the panels from which the shells are stamped by a silk screen technique. The caps with the gaskets or liners in place are fused (fluxed) for one to three minutes at temperatures ranging from 420 to 430° F. depending upon the thickness of the liner. The various techniques and equipment for introducing the plastisols into the caps and for fluxing, fusing or curing the same are well known.

When the gasket or liner compositions are extruded or calendered in sheet form, the gaskets or liners may be punched out and then inserted in the cap shells in known manner. Gaskets or liners may also be molded from the compositions.

A representative and preferred gasket and liner forming composition made in accordance with the present invention is given in Table II below, and for purposes of comparison, corresponding compositions formulated with epoxidized soybean oil and safflower oil plasticizers. Table IIa contains data on the physical properties of the three compositions while Table IIb contains oil extraction data thereon.

TABLE II

[Amount (pts. by wt.)]

| Component | A | B | C |
|---|---|---|---|
| Emulsion Type PVC Homopolymer Resin | 100 | 100 | 100 |
| Epoxidized Soybean Oil (7% Oxirane) (2 Max. Iodine Value) | | | 60 |
| Epoxidized Safflower Oil (7.5% Oxirane) (2 Max. Iodine Value) | | 60 | |
| Epoxidized Linseed Oil (9% Oxirane) (5 Max. Iodine Value) | 60 | | |
| Titanium Dioxide | 1 | 1 | 1 |
| Dimethyl Polysiloxane (350 ctks) | 1 | 1 | 1 |
| Paraffin Wax | 3 | 3 | 3 |

TABLE II(a).—PHYSICAL PROPERTIES

| Component | A | | | B | | | C | | |
|---|---|---|---|---|---|---|---|---|---|
| Brookfield Viscosity, cps.: 10 r.p.m.; 72° F | 98,000 | | | 76,000 | | | 40,000 | | |
| Brookfield Viscosity, cps.: 10 r.p.m.; 120° F | 68,000 | | | 22,000 | | | 20,000 | | |
| Fusion Temp., °F.: .050″ sheet; 3½ min | 375 | 400 | 425 | 375 | 400 | 425 | 375 | 400 | 425 |
| Elongation, percent | 280 | 300 | 343 | 223 | 313 | 330 | 310 | 283 | 276 |
| Moduli 100% | 1,356 | 1,556 | 1,650 | 1,263 | 1,290 | 1,290 | 1,280 | 1,190 | 1,190 |
| Tensile | 2,526 | 2,533 | 2,703 | 2,060 | 2,403 | 2,500 | 2,273 | 2,230 | 2,086 |
| Hardness Shore A | 83.3 | 86.6 | 91.3 | 84.0 | 83.6 | 84 | 84.3 | 81.0 | 83.0 |
| Compressive Set | 54.5 | 49.0 | 46.3 | 46.0 | 41.8 | 47.9 | 44.5 | 45.9 | 41.1 |
| Specific Gravity | 1.26 | 1.27 | 1.27 | 1.27 | 1.26 | 1.26 | 1.22 | 1.24 | 1.23 |
| Specific Permeability in Air, 10⁻⁴ (cu. ft./mil/sq. ft./24 hrs. at 30° C.) | 3.72 | 2.96 | 1.78 | 4.86 | 4.32 | 4.12 | 6.12 | 5.77 | 5.32 |

TABLE II(b).—OIL EXTRACTION DATA

| Component | A | | | | | | B | | | | | | C | | | | | |
|---|---|---|---|---|---|---|---|---|---|---|---|---|---|---|---|---|---|---|
| Fusion Temp., °F.: .050" sheet; 3½ min | 375 | | 400 | | 425 | | 375 | | 400 | | 425 | | 375 | | 400 | | 425 | |
| Oil Extraction Data (Plastisol Discs 1" diameter) | | | | | | | | | | | | | | | | | | |
| Product Media | Peanut Oil | | | | | | | | | | | | | | | | | |
| Storage Period (Mos., 72° F.) | 1 | 2 | 1 | 2 | 1 | 2 | 1 | 2 | 1 | 2 | 1 | 2 | 1 | 2 | 1 | 2 | 1 | 2 |
| Percent Change in Weight | −0.89 | −1.24 | −0.83 | −1.13 | −0.15 | −0.25 | −2.41 | −3.24 | −2.68 | −3.58 | −2.44 | −3.23 | −3.57 | −4.97 | −3.65 | −4.80 | −3.90 | −5.09 |
| Percent Change in Volume | −1.45 | −1.95 | −1.33 | −1.64 | −0.57 | −0.70 | −3.22 | −4.24 | −3.68 | −4.62 | −3.29 | −4.21 | −4.73 | −6.50 | −4.87 | −6.23 | −5.13 | −6.57 |

What is claimed as new is:

1. A closure cap adapted for application to a glass container in sealing relation therewith, said cap having applied to an inner surface thereof a cross-linked gasket or liner composition consisting essentially of vinyl chloride base resin and epoxidized linseed oil having a minimum oxirane content of 9% and a maximum iodine value of 5, the contendt of vinyl chloride base resin exceeding the content of epoxidized linseed oil.

2. A closure cap adapted for application to a glass container in sealing relation therewith, said cap having applied to an inner surface thereof a cross-linked gasket or liner composition containing at least about 90 percent by weight of a mixture of vinyl chloride base resin and epoxidized linseed oil having a minimum oxirane content of 9% and a maximum iodine value of 5, the content of vinyl chloride base resin exceeding the content of epoxidized linseed oil.

3. A closure cap adapted for application to a glass container in sealing relation therewith, said cap having applied to an inner surface thereof a cross-linked gasket or liner composition containing at least about 90 percent by weight of a mixture of vinyl chloride base resin and epoxidized linseed oil having a minimum oxirane content of 9% and a maximu miodine value of 5, there being from about 50 to 90 parts of said epoxidized linseed oil for every 100 parts of the vinyl chloride base resin.

4. The closure cap of claim 3 wherein said composition contains from about 1 to 5 parts of pigment or filler for every 100 parts of vinyl chloride base resin.

5. The closure cap of claim 3 wherein said composition contains for every 100 parts of vinyl chloride base resin from about 1 to 7 parts of a lubricant selected from the group consisting of fatty acids, petroleum waxes and silicone oils.

6. A closure cap adapted for application to a glass container in sealing relation therewith, said cap having applied to an inner surface thereof a cross-linked gasket or liner composition comprising 100 parts by weight of vinyl chloride base resin, from about 50 to 60 parts of epoxidized linseed oil having a minimum oxirane content of 9% and a maximum iodine value of 5, from about 1 to 5 parts of pigment or filler, and from about 1 to 7 parts of a lubricant selected from the group consisting of fatty acids, petroleum waxes, and silicone oils.

7. A closure cap adapted for application to a glass container in sealing relation therewith, said cap having applied to an inner surface thereof a cross-linked gasket or liner composition comprising 100 parts by weight of vinyl chloride base resin, from about 50 to 90 parts of epoxidized linseed oil having a minimum oxirane content of 9% and a maximum iodine value of 5, from about 1 to 5 parts of pigment or filler, and from about 1 to 7 parts of a lubricant selected from the group consisting of fatty acids, petroleum waxes and silicone oils.

References Cited by the Examiner

UNITED STATES PATENTS

| 2,874,863 | 2/1959 | Unger et al. | 260—23 |
| 2,964,484 | 12/1960 | Findley et al. | 260—23 |
| 3,055,778 | 9/1962 | Rhodes | 260—23 |

LEON J. BERCOVITZ, *Primary Examiner.*

R. A. WHITE, *Assistant Examiner.*

UNITED STATES PATENT OFFICE
CERTIFICATE OF CORRECTION

Patent No. 3,283,936                                November 8, 1966

Alfred W. Kehe et al.

It is hereby certified that error appears in the above numbered patent requiring correction and that the said Letters Patent should read as corrected below.

Column 1, line 36, for "an" read -- and --; column 2, lines 56 to 75, for the left-hand portion of the formula reading CHCO read CHOC column 5, line 26, for "contendt" read -- content --; same column 5, line 43, for "maximu miodine" read -- maximum iodine --.

Signed and sealed this 12th day of September 1967.

(SEAL)
Attest:

ERNEST W. SWIDER                            EDWARD J. BRENNER
Attesting Officer                                  Commissioner of Patents